United States Patent Office 3,576,656
Patented Apr. 27, 1971

3,576,656
STABILIZED ZINC OXIDE COATING
COMPOSITIONS
James E. Webb, Administrator of the National Aeronautics and Space Administration, with respect to an invention of Gene A. Zerlaut, Chicago, Ill., Daniel W. Gates, Huntsville, Ala., and William F. Carroll, Altadena, Calif.
No Drawing. Continuation-in-part of application Ser. No. 644,449, June 2, 1967. This application Mar. 11, 1968, Ser. No. 711,903
Int. Cl. C09c 1/04
U.S. Cl. 106—296                                  6 Claims

ABSTRACT OF THE DISCLOSURE

Zinc-oxide-pigmented coating compositions for spacecraft thermal control are prepared by treating zinc oxide with an aqueous alkali metal silicate solution, redispersing the pigment in water and combining the treated pigment with a degradation-resistant binder such as a silicone polymer. The silicate treatment renders zinc oxide pigment resistant to the degradation of reflective properties which would otherwise occur upon exposure to ultraviolet radiation in vacuum. Further improvements in pigment properties are obtained by "sweating" the zinc oxide-silicate reaction product prior to redispersion.

---

The invention described herein was made in the performance of work under a NASA contract and is subject to the provisions of Section 305 of the National Aeronautics and Space Act of 1958, Public Law 85–568 (72 Stat. 435; 42 U.S.C. 2487).

This application is a continuation-in-part of application Ser. No. 644,449, filed June 2, 1967 now abandoned.

This invention relates to coating compositions and more particularly to stabilized, zinc-oxide-pigmented compositions for coating the surface of spacecraft and similar objects.

One of the requirements for long-term operation of space vehicles and equipment is the provision of a suitable reflective coating to afford protection from the intense solar radiation of outer space. In the absence of a stable white coating or other less expedient protective measures the exposed surfaces would become overheated, largely because of energy absorption, and malfunctions of equipment would result from exceeding of operating temperature limitations. In the case of manned spacecraft additional refrigeration equipment would be needed to maintain the temperature at the level required for astronaut survival. Coatings for such applications should exhibit a very low but stable ratio of solar absorptance ($\alpha_s$) to infrared emittance ($\epsilon$), along with favorable mechanical integrity and ease of application.

Zinc-oxide-pigmented coatings similar to previously known paint compositions exhibit favorable reflective and emissive properties for use under normal environmental conditions, but a completely unexpected degration phenomenon has precluded their use for space applications. Zinc oxide has a low absorptance in the visible and infrared wavelength range, and when a zinc oxide pigment is combined with a suitable binder a highly reflective coating with good mechanical properties is obtained. However, when zinc oxide is simultaneously exposed to ultraviolet radiation and a vacuum, these conditions existing in the environment of outer space, a rapid degradation of reflective properties occurs in the infrared region. Infrared reflectance at about 2.0 microns wavelength is decreased by twenty-five percent within a period of approximately 100 equivalent sun hours (ESH) and absorptance is correspondingly increased so that the effectiveness of the coating is sharply reduced. Discovery and measurement of the effects of this phenomenon in laboratory studies have been complicated by the fact that the degraded zinc oxide is restored to its original state almost instantaneously upon exposure to air so that post-irradiation reflectance measurements fail to show any degradation unless they are made in situ.

It is therefore an object of this invention to provide stabilized thermal control coating compositions for spacecraft.

Another object is to provide zinc-oxide-pigmented compositions resistant to degradation of reflective properties upon exposure to ultraviolet radiation in vacuum.

Still another object is to provide a method of treating zinc oxide pigment to protect it from loss of infrared reflectance upon exposure to ultraviolet radiation in vacuum.

Other objects and advantages will be apparent from the following detailed description and appended claims.

DETAILED DESCRIPTION OF THE INVENTION

In accordance with this invention degradation-resistant coating compositions are prepared by treating zinc oxide pigment with an aqueous alkali metal silicate solution and combining the treated pigment with a suitable binder. Degradation of pigment reflective properties upon exposure to ultraviolet radiation in vacuum is minimized by the silicate treatment, and long-term stability to the environment of outer space is obtained.

Although this invention is not to be understood as limited to a particular theory, it is postulated that the degradation of untreated zinc oxide pigment observed upon exposure to ultraviolet radiation in vacuum results from photodesorption of the zinc oxide surface, producing a surface state that absorbs infrared radiation to an increased extent. Silicate treatment of the zinc oxide prevents desorption, probably by formation of a wetted layer of alkali metal silicate or a layer of zinc orthosilicate reaction product on the zinc oxide surface.

The starting zinc oxide for use in the present composition can be any finely divided zinc oxide pigment. For maximum reflectance the pigment should have a high purity and an average particle size within the range of about 0.2 to 1.5 microns. In addition, it is preferred to use zinc oxide pigment which has been prepared initially in the form of particles in this size range so that the particles are not subjected to prolonged grinding. Reflectance is decreased for excessively ground particles owing to surface damage known as "mill yellowing."

An alternate pigment heating step can be used prior to or after the silicate treatment to extend the shelf life of the coating composition. Heating the pigment at a temperature of 500° to 650° C. for a period of 2 to 16 hours serves to decrease gelation of the composition in storage. This heating step, however, if preformed prior to the silicate treatment, will increase the particle size and hence decrease the reactivity of the zinc oxide to the silicate, resulting in decreased protection against degradation at infrared wavelengths.

Resistance to degradation by ultraviolet radiation in vacuum is imparted to the zinc oxide pigment by intimately contacting it with an aqueous alkali metal silicate solution. Any alkali metal silicate such as potassium silicate or sodium silicate can be used, and potassium silicate is preferred. Commercially available potassium silicates, which vary in composition from $K_2O \cdot 3.9SiO$ to $K_2O \cdot 3SiO$, can be employed, and best results are obtained by using material of the composition $K_2O \cdot 3.3SiO$. A silicate concentration of 20 to 40 percent by weight in the solution and a zinc oxide-to-silicate weight ratio of 1:0.8 to 1:0.3 in the resulting mixture can be used.

The zinc oxide pigment is intimately contacted with the silicate solution by combining these materials to form a slurry and subjecting the slurry to rapid mixing for a period of time dependent on the quantity of materials, the viscosity and the temperature. In general a period of 15 minutes to 5 hours provides the desired extent of surface reaction, with the longer contacting periods being employed for lower temperatures. The temperature in this step is not critical, and room temperature can be used. However, a temperature of 80° C. to 100° C. is preferred to enhance the zinc oxide-silicate reaction. Following the silicate treatment the pigment is separated from the bulk of the liquid phase by means such as filtration.

The silicate-treated pigment is repeatedly dispersed in water to remove excess alkali silicate. The product of the zinc oxide-silicate reaction, in the form of moistened filter cake or the like, can be re-dispersed without any additional treatment. However, it is preferred to subject this material to a "sweating" procedure by means of which pigment properties are further enhanced prior to re-dispersion. In the "sweating" procedure the moistened filter cake is enclosed by wrapping tightly with a sheet of moisture impermeable material such as aluminum foil and allowed to stand in this condition at room temperature. A "sweating" period from about 6 to 16 hours is preferred, and up to 24 hours can be used. Longer "sweating" times are to be avoided since excessive thixotropy and loss of cure in the coating composition will occur as a result. The "sweating" procedure produces a further improvement in stability of the pigment to ultraviolet radiation in vacuum, along with better whiteness and softness. These improvements are believed to be caused by further reaction of the zinc oxide with silicate and an increase in the amount of silicate reaction product on the zinc oxide surface, obtained without increasing the amount of alkali.

The treated pigment, preferably after having been subjected to "sweating" as described above, is re-dispersed in water from one to five times. At least one re-dispersion step is required, and two to three re-dispersions will usually result in a treated pigment with the most favorable overall properties. The extent of removal of excess alkali metal is evidenced by the pH of the system, which decreases with additional re-dispersions. The need for further re-dispersions is indicated by a pH over 11.0 to 11.5. Continued re-dispersions below this pH will reduce the effectiveness of the silicate treatment in preventing degradation of reflective properties upon exposure to ultraviolet radiation in vacuum.

The presence of excess alkali silicate in the treated product could be reduced by providing an acidic buffering agent in the system during the initial reaction or subsequent re-dispersion steps, this measure having been used in a previously known silicate treatment of zinc oxide to render it compatible with certain organic resins, as is disclosed in U.S. Pat. 3,083,113, issued to Korf et al. Acidic buffering agents, however, produce undesirable effects in the treated product. Mineral acids such as hydrochloric acid result in yellowing from chloride formation, and organic acids such as formic acid result in environmental instability.

Following re-dispersion as described above, the zinc oxide pigment is separated from the liquid phase by means such as filtration and is dried, preferably by heating at a temperature of 150° to 250° F. for 8 to 48 hours. If necessary, the dried pigment is then broken up by means of a grinding procedure which produces a minimum abrasion of the zinc oxide particles. Dry grinding, whether by hand-milling or dry ball-milling should be avoided altogether since stability to the space environment would be decreased thereby. Wet grinding in as viscous a slurry as possible and using a minimum amount of vehicle is preferred. The binder component, to be described below, can be used as the vehicle in this step. The proper materials balance can be obtained by adjusting the amount of vehicle in the "let down" in a wet-grinding apparatus. Wet ball-milling using corundum-fortified porcelain balls and jars is suitable for this purpose. More abrasive grinding media are to be avoided. A wet-grinding time of one hour is adequate under optimum conditions.

The silicate-treated zinc oxide-pigment is then combined with a suitable binder to produce a degradation-resistant coating. The binder as well as the pigment must be stable to ultraviolet radiation, and the organic resins normally used as binders in the conventional coatings fail to exhibit the necessary stability. Silicone-type polymers, however, are stable to ultraviolet radiation, and they are available in the form of resins or elastomers particularly suited for use as a coating binder. Examples of binders which can be used include polydimethylsiloxane elastomer having the general formula

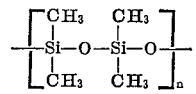

where $n$ is 5 to 30 and the molar ratio of methyl groups to silicon is 1.99 to 2.0, available commercially from the General Electric Company under the designation "RTV–602," and polymethylsiloxane having the general formula

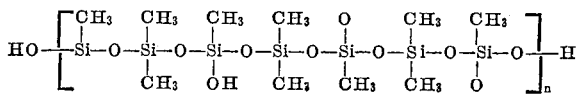

where $n$ is 3 to 30 and the molar ratio of methyl groups to silicon is 1.2 to 1.8, a suitable polymer of this type being available commercially from the Owens–Illinois Glass Company under the designation "OI–650 glass resin."

Other resins which are stable to ultraviolet radiation can also be used within the scope of the present invention. Previously known curing catalysts such as the amine catalyst available from General Electric Company under the designation "SRC–05" for the methyl silicone elastomer given above can be used in small amounts for example, 0.5 to 1.0 weight percent of the binder, to enhance curing of the binder. An inorganic binder such as sodium silicate or potassium silicate can be used, but the resulting composition may have poor mechanical strength and a tendency to spalling or chipping.

An inert organic solvent or thinner such as benzene or toluene is mixed with the binder and pigment to provide the desired consistency for application of the coating. Improved shelf life of the coating composition can be obtained by using a mixed solvent system containing retarder solvents such as xylene, isopropanol, n-butanol and isopropyl acetate in addition to the principal solvent. A particular solvent system providing maximum shelf life includes the following components, in volume percent: toluene, 50; xylene, 25; isopropanol, 15; and n-butanol, 10. A solvent proportion of 40 to 60 volume percent in the resulting liquid mixture can be used. The zinc oxide pigment can be provided in the composition at a concentration of 15 to 50 volume percent, based on the dried film, and 35 to 40 pigment volume percent concentration is preferred.

In a particular embodiment of the invention the following ingredients, in weight percent, are combined: silicate-treated zinc oxide pigment, 41 to 52; polydimethylsiloxane binder, 17 to 20; amine curing catalyst, 0.08 to 0.16; and inert organic solvent, 30 to 40. A homogeneous mixture suitable for application as a coating is obtained by pebble milling of the resulting mixture.

The compositions prepared as described above can be applied by means of spraying or otherwise spreading them on the surface to be protected. These compositions cure to form a hard, tough coating in a period of 4 to 24 hours. The coating is applied at the thickness required for maximum solar reflectance, for example, at least 6 mils for a composition having a silicone binder and a zinc oxide pigment concentration of 40 volume percent.

The invention is further illustrated by the following examples.

EXAMPLE I

Specimens of coatings containing silicate-treated and untreated zinc oxide pigments were subjected to ultraviolet radiation in vacuum to determine the effect of silicate treatment on degradation of reflectance. The untreated coating composition comprised zinc oxide pigment (available commercially from New Jersey Zinc Company under the designation "SP–500") dispersed in a polydimethylsiloxane binder (available commercially from General Electric Company under the designation "RTV–602") with a toluene solvent thinner and an amine curing catalyst (available commercially from General Electric Company under the designation "SRC–05") at relative weight proportions of 240, 100, 175 and 0.5, respectively, the pigment volume concentration being 30 percent. The silicate-treated composition was prepared by mixing 600 grams "SP–500" zinc oxide with 1200 grams potassium silicate (chemical composition $K_2O \cdot 3.3SiO_2$, solids content 35 percent by weight) in a two-quart ball-mill jar. Twenty cylindrical grinding stones one inch long by one-half inch in diameter were added to the mill, and the slurry was ground at approximately 75 percent of critical speed for 45 minutes. The mixture was then allowed to stand for 16 hours and was re-ground for 10 minutes. The ground slurry was transferred to a 3 liter beaker and diluted with 800 milliliters of distilled water. The mixture was then stirred thoroughly, filtered and washed with 3 liters of distilled water. The filter cake was dried in a forced air oven for 16 hours at 100° C. and was broken up by dry grinding with 20 grinding stones for 15 minutes. The ground pigment was then reheated for one hour at 100° C. The resulting pigment was then combined with polydimethylsiloxane, amine curing catalyst, and toluene at weight proportions of 240, 100, 0.5, and 184, respectively, to give a pigment volume concentration of 30 percent. A second formulation was prepared by combining these ingredients at weight proportions of 374, 100, 0.5, and 215 to give a pigment volume concentration of 40 percent. The untreated composition and each of the treated formulations were applied as a 0.007 inch thick coating on aluminum specimens. The coated specimens were then subjected to ultraviolet radiation in vacuum for varying periods. Reflectance at a wavelength of 2.05 microns was measured in situ before and after irradiation. The specimen coated with the untreated composition showed a decrease of 28 percent in reflectance at this wavelength after 100 hours (1200 equivalent sun hours). Another untreated specimen showed a decrease of 11 percent in reflectance after only 15 minutes (3 equivalent sun hours). Specimens coated with the treated formulation containing 30 volume percent pigment showed reflectance losses of 2 percent in each case after irradiation for one and two hours (12 and 24 equivalent sun hours) and one specimen coated with this formulation showed no decrease in reflectance after 120 hours irradiation (600 equivalent sun hours). Specimens coated with the treated formulation containing 40 volume percent pigment showed losses of 2 to 3 percent in reflectance after 120 hours irradiation (600 equivalent sun hours). The untreated specimens were also tested after exposure to air, and their reflectances were found to be restored to their original values.

EXAMPLE II

An untreated zinc oxide-pigmented specimen prepared by the procedure of Example I to contain 35 volume percent pigment exhibited a loss in reflectance of 26 percent at a wavelength of 2.05 microns when subjected to ultraviolet radiation in vacuum for 40 hours. The reflectance loss instantly returned to within one percent of the original value upon admission of air to the specimen chamber. A specimen coated with a composition containing zinc oxide treated with potassium silicate by the procedure of Example I at a pigment concentration of 35 volume percent showed a loss in reflectance of only 4 percent under the same conditions of irradiation. Upon admission of air to the specimen chamber the reflectance of the treated specimen increased by only one percent.

EXAMPLE III

A specimen of untreated "SP–500" zinc oxide powder was mulled with water and applied to a hot (about 200° F.) aluminum substrate by spraying using an air brush. This specimen showed a reflectance decrease of 20 percent at a wavelength of 2.5 microns after 40 hours of ultraviolet radiation at 5 solar equivalents. A specimen utilizing zinc oxide treated with potassium silicate by the procedure of Example I showed a reflectance decrease of only one percent when irradiated to the same extent.

EXAMPLE IV

The composition containing silicate-treated zinc oxide at a concentration of 30 volume percent, as described in Example I, was applied to the exposure surfaces of a lunar orbiter space vehicle which had previously been coated with a polydimethylsiloxane composition containing untreated zinc oxide pigment. During actual lunar orbiting the internal temperature of the spacecraft increased to a sunset level of 89° C. due to solar exposure. A similar spacecraft coated with only the untreated zinc oxide containing composition showed a corresponding temperature of 94.3° C. At full solar cell power the operating lifetime of the spacecraft is increased from 13 days to over 30 days as a result of the lower temperature realized by use of silicate-treated zinc oxide. A further decrease of at least 4½° C. in the sunset temperature level can be obtained by applying the silicate-treated composition directly to the surface of the spacecraft rather than over a previously applied coating of an untreated composition.

EXAMPLE V

A silicate-treated zinc oxide pigment was prepared by mixing 1000 grams zinc oxide ("SP–500") with 1750 grams of potassium silicate solution containing 35 percent solids (chemical composition $K_2O \cdot 3.3SiO_2$) and 275 grams distilled water and heating the mixture under rapid agitation at 160° F. to 170° F. for 20 minutes. The viscosity of the mixture increased greatly during the reaction period. The product was then diluted with 3000 grams distilled water and filtered through a Buchner filter at reduced pressure. The resulting filter cake was wrapped in unplasticized Mylar and allowed to "sweat" overnight.

The filter cake was then twice dispersed in 3000 grams distilled water, agitated for 15 minutes and refiltered. The filter cake from the third filtration was spread thinly on aluminum foil and dried for 18 hours at 225° F. When dry, the large lumps were lightly broken up by hand, and the pigment, without any dry grinding or mulling, was employed in the preparation of a coating composition. The composition was prepared by combining the following components in weight percent: silicate-treated zinc oxide, 41; methyl silicone elastomer "RTV–602," 19; toluene, 16; xylene, 8; n-butanol, 6; isopropanol, 8; n-butyl acetate, 2. The mixture was ground in a porcelain ball mill for 2 hours at ⅔ critical speed. After milling, 0.5 weight percent amine curing catalyst ("SRC–05"), based on the weight of the elastomer, was added to the mixture.

The resulting coating composition was applied on an aluminum substrate by spraying. The coated article was then irradiated in vacuum with ultraviolet radiation for 1400 equivalent solar hours at 6 solar equivalents. After irradiation the coating exhibited an increase in solar absorptance of only 0.02 over the original value of 0.2. The maximum bleachable damage in the 2.0 to 2.6 micron wavelength did not exceed a one percent loss in reflectance.

What is claimed is:

1. The method of treating zinc oxide pigment to render the same resistant to degradation of reflective properties upon being exposed to ultraviolet radiation in vacuum which comprises intimately contacting said pigment with an alkali metal silicate solution at a zinc oxide to alkali metal silicate weight ratio of 1:0.8 to 1:0.3 in the absence of an acidfying agent, separating the resulting solids from the bulk of the remaining liquid, enclosing said resulting solids while in moistened condition in moisture-impermeable container means, allowing the enclosed solids to stand therein at room temperature for a period of 6 to 24 hours, dispersing said resulting solids in water at least once and recovering the resulting dispersed solids.

2. The method of claim 1 wherein said resulting solids are allowed to stand for a period of about 6 to 16 hours.

3. The method of claim 1 wherein the silicate concentration in said solution is 20 to 40 weight percent.

4. The method of claim 3 wherein said resulting solids are dispersed in water 2 to 3 times.

5. The method of claim 3 wherein said resulting solids are repeatedly dispersed in water until the pH of the resulting slurry is below 11.0 to 11.5.

6. The method of claim 3 wherein said alkali metal silicate is potassium silicate.

References Cited

UNITED STATES PATENTS

| | | | |
|---|---|---|---|
| 3,083,113 | 3/1963 | Korf et al. | 106—296 |
| 3,364,065 | 1/1968 | Cutright | 106—84 |

JAMES E. POER, Primary Examiner

U.S. Cl. X.R.

106—308